US006232428B1

(12) United States Patent
Deets et al.

(10) Patent No.: US 6,232,428 B1
(45) Date of Patent: May 15, 2001

(54) ESSENTIALLY COLORLESS, TRANSPARENT POLYIMIDE COATINGS AND FILMS

(75) Inventors: Gary L. Deets, Coventry, CT (US); Toshiyuki Hattori, East Brunswick, NJ (US)

(73) Assignee: I.S.T. Corporation, Springfield, MA (US)

( * ) Notice: Subject to any disclaimer, the term of this patent is extended or adjusted under 35 U.S.C. 154(b) by 0 days.

(21) Appl. No.: 09/483,345

(22) Filed: Jan. 14, 2000

Related U.S. Application Data

(60) Provisional application No. 60/116,287, filed on Jan. 19, 1999.

(51) Int. Cl.[7] .......................... C08G 73/10; C08G 69/26; C08G 69/28
(52) U.S. Cl. .......................... 528/170; 528/125; 528/126; 528/128; 528/171; 528/172; 528/173; 528/174; 528/176; 528/179; 528/183; 528/185; 528/188; 528/220; 528/229; 528/350; 528/353; 428/473.5
(58) Field of Search ................................... 528/353, 125, 528/128, 171, 172, 173, 174, 176, 179, 183, 185, 188, 220, 229, 350; 428/473.5

(56) References Cited

U.S. PATENT DOCUMENTS

| | | |
|---|---|---|
| 4,206,106 | 6/1980 | Heilman et al. . |
| 4,595,548 | 6/1986 | St. Clair et al. . |
| 4,603,061 | 7/1986 | St. Clair et al. . |
| 4,874,834 | 10/1989 | Higashi et al. . |
| 4,876,329 | 10/1989 | Chiang et al. . |
| 4,876,330 | 10/1989 | Higashi et al. . |
| 4,962,183 | 10/1990 | Chen, Sr. et al. . |
| 5,120,826 | 6/1992 | Vora et al. . |
| 5,218,077 | 6/1993 | St. Clair et al. . |
| 5,231,162 | 7/1993 | Yasuhisa Nagata . |
| 5,346,982 * | 9/1994 | Tamai et al. .......................... 528/353 |
| 5,354,839 | 10/1994 | Yamashita et al. . |
| 5,374,708 * | 12/1994 | Tamai et al. .......................... 528/353 |
| 5,410,084 | 4/1995 | Matsuo et al. . |
| 5,449,742 | 9/1995 | Beuhler et al. . |
| 5,470,943 | 11/1995 | Sakata et al. . |
| 5,473,010 * | 12/1995 | Morita et al. .......................... 528/353 |
| 5,494,996 * | 2/1996 | Tamai et al. .......................... 528/353 |
| 5,756,650 | 5/1998 | Kawamonzen et al. . |

FOREIGN PATENT DOCUMENTS 5-255501   10/1993   (JP) .

* cited by examiner

*Primary Examiner*—P. Hampton-Hightower
(74) *Attorney, Agent, or Firm*—Holland & Bonzagni, P.C.; Mary R. Bonzagni, Esq.

(57) ABSTRACT

Essentially colorless, transparent polyimide coatings and films prepared by combining aromatic dianhydrides with para-substituted aromatic diamines are provided. The polyimide coatings and films are produced by a process whereby the dianhydride and diamine monomer components are reacted at temperatures of greater than 80° C.

26 Claims, No Drawings

ESSENTIALLY COLORLESS, TRANSPARENT POLYIMIDE COATINGS AND FILMS

This utility application is based in part on Provisional Patent Application Serial No. 60/116,287, filed Jan. 19, 1999.

FIELD OF THE INVENTION

The present invention generally relates to essentially colorless, transparent polyimide coatings and films and to a process for preparing same. The present invention more particularly relates to essentially colorless, transparent polyimide coatings for optical fibers and essentially colorless, transparent polyimide films useful for thermal protective coatings and the like.

BACKGROUND OF THE INVENTION

Polyimide coatings and films have been selected for use in a number of different product applications where thermal stability and good electrical and mechanical properties are deemed necessary and/or desirable. Polyimide coatings and films having the additional property of good transparency have been used extensively as oriented films in liquid crystal display devices, fiber optic cable coatings, waveguides and protective coatings for solar cells. Although such polyimide coatings and films have good transparency, they are often colored yellow or brown as a result of a severe heat history leading to their formation. This coloration is deemed unacceptable in applications such as liquid crystal oriented films where the coloration darkens the visual field thereby impairing the function of the display device on which the film is used.

In response to this noted deficiency, various polyimide coatings and films have been developed that demonstrate a small degree of coloration and high transparency. The development of such prior art coatings and films has been guided by a series of studies that has focused on the cause of coloration in transparent polyimide films. These studies have reported that the coloration of a polyimide depends greatly upon the types of aromatic tetracarboxylic acid dianhydrides and diamino compounds selected for use as starting materials for the polyimide. In particular, these studies have reported that an aromatic diamine having the amino groups at the m-position is especially effective as the diamino compound, and the combination of it with a biphenyltetracarboxylic acid dianhydride can lead to the formation of a colorless, transparent polyimide (see Cols. 1–2, lines 64–6 of U.S. Pat. No. 4,876,330 to Higashi et al.).

The development of such prior art coatings and films has also been guided by the well-known principle that higher formation or polymerization temperatures adversely impact upon the degree of coloration of the resulting polyimide. In practice, these prior art polyimides are prepared by processes whereby the aromatic tetracarboxylic acid dianhydride and diamino compound are polymerized at temperatures of 80° C. or less to form a polyamic acid solution and then, the polyamic acid is imidized by either thermal or chemical means (see Col. 8, lines 25–39 of U.S. Pat. No. 4,876,330 to Higashi et al.).

In accordance with the above, an object of the present invention is to provide a novel, essentially colorless, transparent polyamic acid solution and polyimide coating or film that serve to negate commonly held principles and beliefs.

It is a further object of the present invention to provide a process for preparing such coatings or films that also runs contrary to established findings.

SUMMARY OF THE INVENTION

The present invention therefore relates to an essentially colorless, transparent polyamic acid solution prepared by reacting at least one aromatic tetracarboxylic acid dianhydride represented by general formula:

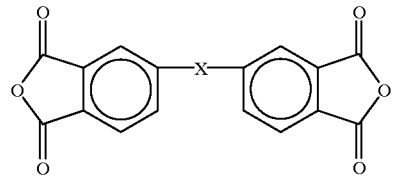

where X represents —O—, —S—, —SO—, —SO$_2$—, —CH$_2$—, —CF$_2$—, —C(CH$_3$)$_2$—, —C(CF$_3$)$_2$— or a direct bond, with at least one para-substituted aromatic diamine represented by either general formula (I)

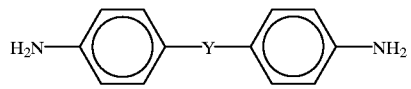

or general formula (II)

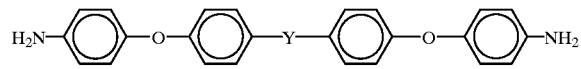

where Y represents —O—, —S—, —SO—, —SO$_2$—, —CH$_2$—, —CF$_2$—, —C(CH$_3$)$_2$—, —C(CF$_3$)$_2$—, —CO— or a direct bond.

The present invention also relates to an essentially colorless, transparent polyimide coating or film that comprises at least one recurring structural unit of general formula (A)

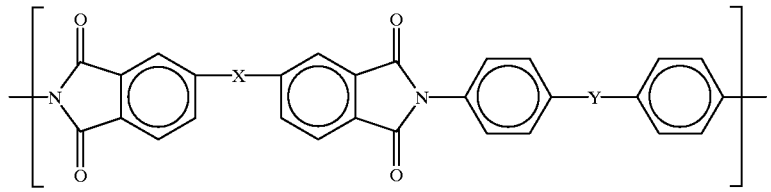

or general formula (B)

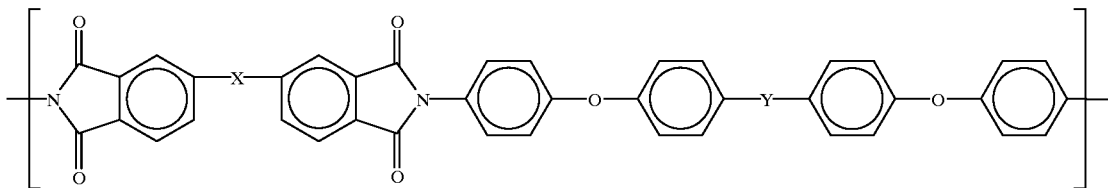

where X represents —O—, —S—, —SO—, —SO$_2$—, —CH$_2$—, —CF$_2$—, —C(CH$_3$)$_2$—, —C(CF$_3$)$_2$— or a direct bond and where Y represents —O—, —S—, —SO—, —SO$_2$—, —CH$_2$—, —CF$_2$—, —C(CH$_3$)$_2$—, —C(CF$_3$)$_2$— CO— or a direct bond.

The present invention further relates to a process for preparing the essentially colorless, transparent polyimide coating or film described above which comprises:

preparing a polyamic acid solution by reacting the above referenced dianhydride and diamine monomer components in an organic polar solvent;

forming a coating or film of the polyamic acid from the prepared polyamic acid solution; and imidizing the polyamic acid in the formed coating or film to a polyimide.

The foregoing and other features and advantages of the present invention will become more apparent from the following description.

DETAILED DESCRIPTION OF THE INVENTION

Applicants, by way of the present invention have made the surprising discovery that aromatic diamines having amino groups at the p-position can serve as effective starting materials for essentially colorless, transparent polyimides. In particular, Applicants have found that the combination of aromatic tetracarboxylic acid dianhydrides and para-substituted aromatic diamines can also lead to the formation of essentially colorless, transparent polyimide coatings and films.

Due to the low degree of coloration achieved by way of the present invention, it is now possible to produce opaque white and blue transparent polyimide coatings and films. Such coatings and films are particularly desirable for use with optical fibers, liquid crystal display devices, solar cells and wave guides.

The aromatic tetracarboxylic acid dianhydride of the present invention is represented by the following general formula:

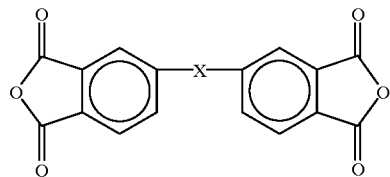

where X represents —O—, —S—, —SO—, —SO$_2$—, —CH$_2$—, —CF$_2$—, —C(CH$_3$)$_2$—, —C(CF$_3$)$_2$— or a direct bond. Examples of aromatic tetracarboxylic acid dianhydrides include biphenyl dianhydride, 2,2-bis(3,4-dicarboxylphenyl) hexafluoropropane dianhydride, diphenylsulfone dianhydride, 2,2-bis(3,4'-dicarboxyphenyl) propane dianhydride, diphenylsulfide dianhydride, diphenylsulfoxide dianhydride, oxydiphthalic anhydride, biphenyltetracarboxylic acid dianhydride and benzophenone tetracarboxylic acid dianhydride. In a preferred embodiment X is a fluorine-substituted aliphatic hydrocarbon group. In a more preferred embodiment, the aromatic tetracarboxylic acid dianhydride monomer component of the present invention is 2,2-bis(3,4-dicarboxyphenyl) hexafluoropropane dianhydride or 6FDA,

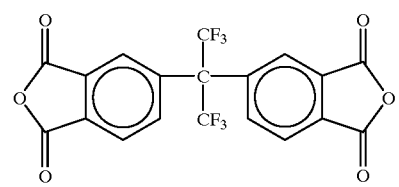

In another more preferred embodiment X is a direct bond and the aromatic tetracarboxylic acid dianhydride monomer component is biphenyltetracarboxylic acid dianhydride or BPDA,

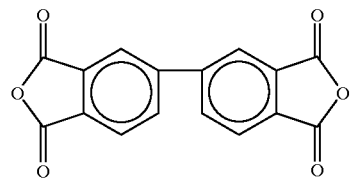

The aromatic diamine of the present invention is a para-substituted aromatic diamine represented by either general formula (I)

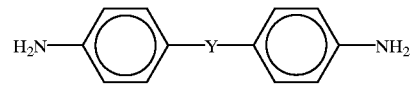

or general formula (II)

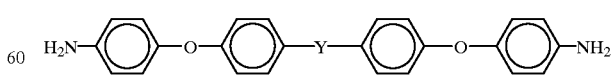

where Y represents —O—, —S—, —SO—, —SO$_2$—, —CH$_2$—, —CF$_2$—, —C(CH$_3$)$_2$—, —C(CF$_3$)$_2$—, —CO— or a direct bond. Examples of para-substituted aromatic diamines include bis[4-aminophenyl] sulfone, 4,4'-biphenyl diamine, oxydi aniline, 4,4'- diaminophenyl sulfone, 4,4'-diaminophenyl sulfide, 4,4'-diaminodiphenyl sulfoxide, methylene dianiline, 4,4'-diaminodiphenyl difluoromethane, 2,2'-bis[4-(4-aminophenoxy)phenyl] propane (BAPP) and bis [4-(4-aminophenoxy)phenyl] sulfone (BAPS).

In a preferred embodiment Y is a direct bond and the aromatic diamine is 4,4'-biphenyl diamine.

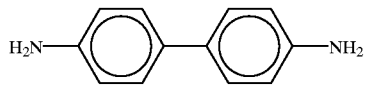

In another preferred embodiment Y is a sulfonyl group and the aromatic diamine is bis[4-aminophenyl]sulfone or 4,4-DDS,

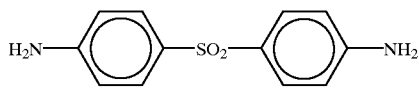

When a diamine containing $SO_2$ functionality (e.g., 4,4-DDS) and/or Ar—O— Ar ether linkages (e.g., BAPP or BAPS) is used in preparing the polyamic acid solution of the present invention it is preferred that a second diamine monomer be employed therewith for the purpose of reducing color and/or improving toughness in the resulting polyimide. The second diamine monomer can be either a para- or meta-substituted aromatic diamine. Examples of meta-substituted aromatic diamines include bis[4-(3-aminophenoxy)phenyl] sulfone or BAPSM, 1,3-metaphenylene diamine or MPDA and 3,4'-oxydianiline or 3,4-ODA.

In a preferred embodiment, the polyamic acid solution of the present invention is prepared using from about 65 to about 85% by weight bis[4-aminophenyl] sulfone or 4,4-DDS monomer and from about 15 to about 35% by weight bis[4-(3-aminophenoxy)phenyl] sulfone or BAPSM monomer, based on the total weight of the diamine monomers.

In yet a more preferred embodiment, the polyamic acid solution of the present invention is prepared using biphenytetracarboxylic acid dianhydride (BPDA) and/or 2,2-bis(3,4-dicarboxyphenyl) hexafluoropropane dianhydride (6FDA) monomer(s), bis[4-aminophenyl] sulfone (4,4-DDS) monomer and bis[4-(3-aminophenoxy)phenyl] sulfone (BAPSM) monomer.

The polyamic acid or coating solution of the present invention is prepared by reacting or polymerizing the above-referenced aromatic tetracarboxylic acid dianhydride and aromatic diamine monomer components in an organic polar solvent at temperatures of greater than 80° C., and preferably from about 85 to about 95° C., in an inert atmosphere. Reaction times are less than 4 hours, and preferably less than 2 hours. Applicants, by way of the present invention have made the surprising discovery that reaction or polymerization temperatures of greater than 80° C. do not adversely impact upon the degree of coloration of the resulting polyamic acid solution or the polyimide coating or film prepared therefrom. In addition, increased reaction temperatures and the resultant reduction in reaction times favorably affect process economics.

As will be evident to those skilled in the art, it is preferred that when the polyamic acid or coating solution is prepared, the dianhydride and diamine monomer components are reacted in an equimolar ratio as much as possible to increase the degree of polymerization. It is therefore preferred that the molar ratio of dianhydride/diamine be kept in the range of 0.9 to 1.1/1.0, and more preferably 0.98 to 1.02/1.0. The molecular weight of the polyamic acid in the polyamic acid solution of the present invention is preferably 5,000 to 500,000, and more preferably 15,000 to 100,000.

Organic polar solvents useful in the present invention are those solvents that are inert to the polymerization reaction, that are capable of dissolving the monomer components and that do not decompose during thermal imidization. Examples of such solvents are dimethylacetamide, dimethylformamide, tetrahydrofuran and dioxolane with the preferred solvent being N,N-dimethylacetamide (DMAC). These solvents may be used alone, as a mixture or mixed with other solvents such as, toluene, xylene or aromatic hydrocarbons.

In addition to the dianhydride and diamine monomer components, the reaction mixture may advantageously contain additives such as processing or flow aids (e.g. MODA-FLOW® flow aid), antioxidants, dyes, inorganic pigments (e.g., titanium dioxide, $TiO_2$) and fillers (e.g., polytetrafluoroethylene, fluorinated ethylene/propylene copolymers) that do not adversely affect the transparency and low color properties of the resulting polyimide coating or film.

To facilitate handling of the polyamic acid solution, it is preferred that the concentration of polyamic acid in the solution range from about 10 to 30% by weight, preferably from about 20 to about 25% by weight, and that the viscosity of the solution range from about 100 to about 10,000 cps.

Once prepared, the polyamic acid solution may be cast or coated onto an optically useful article. Optically useful articles contemplated for use with the present invention include, but are not limited to, liquid crystal displays, fiber optic cables, waveguides and solar cells.

Upon completion of the casting or coating process, the organic polar solvent is removed from the polyamic acid solution and the polyamic acid chemically or thermally imidized to a polyimide.

In a preferred embodiment, a 20 to 25% by weight polyamic acid solution having a viscosity in the range of from about 500 to about 2500 cps is cast onto a glass plate, a stainless steel plate or the like to a defined thickness. The removal of the polar solvent and the imidization of the polyamic acid is then carried out either sequentially or concurrently. In a more preferred embodiment, the polyamic acid solution is cast onto a target surface and dried at temperatures of from 80 to 120° C. for 30 to 120 minutes to form a film. The temperature is then increased to 200° C. and this temperature maintained for 10 to 180 minutes. The temperature is then increased to 250° C. and this temperature maintained for 30 to 120 minutes thereby imidizing the film to a polyimide film.

Alternatively, the imide can be ring closed by way of a chemical imidization method. In a preferred embodiment, acetic anhydride and a tertiary amine are employed as catalysts for ring closure. In a more preferred embodiment, a strong acid such as methane sulfonic acid is employed as a catalyst and azetropic water removed by use of a co-solvent such as toluene.

In another preferred embodiment, the polyamic acid solution of the present invention is applied as a coating to optical fibers. In particular, an optical fiber is passed through a coating applicator and a 20 to 25% by weight polyamic acid solution having a viscosity in the range of from about 500 to about 2500 cps is applied over the length of the fiber. The removal of the polar solvent and the imidization of the polyamic acid is then preferably carried out by passing the coated optical fiber(s) through an oven with temperature zones ranging from 120° C. to 300° C. at a rate of from 0.3 meter/minute (m/min) to 9.3 to 12.4 m/min.

The resulting polyimide film or coating is essentially colorless and transparent. In a preferred embodiment, the film or coating demonstrates a % transmittance of at least 70% at 440 nanometers (nm) for film or coating thicknesses of 20±10 micrometers ($\mu$m), and a yellowness index of <40 (ASTM# D1925).

The invention is now described with reference to the following examples which are for the purpose of illustration only and are not intended to imply any limitation on the scope of the invention. The components described below are reacted or polymerized in a number of different combinations and ratios and tested for various properties.

Components Used

Dianhydrides:
6FDA—2,2-bis(3,4-dicarboxyphenyl)hexafluoropropane dianhydride monomer obtained from Clariant Corp., Charlotte, N.C., under the product designation 6FDA—EG.
BPDA—biphenyltetracarboxylic acid dianhydride monomer obtained from Mitsubishi Chemical Corporation, Tokyo, Japan, under the product designation BPDA.
BTDA—3,3',4,4'-benzophenontetracarboxylic dianhydride monomer obtained from Laporte Fine Chemicals USA, Pittsburg, Kans., under the product designation BTDA.

Diamines:
44DDS—4,4'-diaminodiphenyl sulfone monomer obtained from Wakayama Seika Kogyo Co., Ltd., Wakayama, Japan, under the product designation Seikacure S.
BAPP—2,2'-bis[4-(4-aminophenoxy)phenyl] propane monomer obtained from Wakayama Seika Kogyo Co., Ltd., Wakayama, Japan, under the product designation BAPP.
BAPS—bis[4-(4-aminophenoxy)phenyl] sulfone monomer obtained from Wakayama Seika Kogyo Co., Ltd., Wakayama, Japan, under the product designation BAPS.
BAPSM—bis[4-(3-aminophenoxy)phenyl] sulfone monomer obtained from Wakayama Seika Kogyo Co., Ltd., Wakayama, Japan, under the product designation BAPSM.
MDA—methylene dianiline monomer obtained from BASF Corporation, Mount Olive, N.J., under the product designation Methylene dianiline.

Organic Polar Solvent:
DMAC—N,N-dimethylacetamide obtained from Fisher Scientific Co., Pittsburgh, Pa., under the product designation N,N-dimethyl acetamide Reagent Grade.

Sample Preparation and Test Methods

Synthesis of Polyamic Acid Solution:

A quantity of a diamine monomer(s) and DMAC solvent were charged into a reactor and agitated under a nitrogen atmosphere and reflux at 30° C. until the diamine monomer(s) was completely dissolved in the DMAC solvent. A quantity of dianhydride monomer was then added to the reactor and the resulting mixture gradually heated to a temperature of 90° C. The temperature of the mixture was maintained at 90° C. for 60 minutes to form a polyamic acid solution.

The molar ratio of the dianhydride and diamine monomer components used to prepare the polyamic acid solution was 1.0/1.005.

The polyamic acid solution was then cooled to room temperature and stored in a refrigerator maintained at a temperature of $\leq 0$ ° C.

Preparation of Polyimide Film:

The polyamic acid solution was placed in a desiccator and held therein at a pressure of 10 mm Hg for one hour so as to effect degassing of the solution. The degassed solution was then cast onto a release-coated glass plate to a film thickness of 30 micrometers ($\mu$m). Thickness uniformity across the cast film was effected by way of a drawn down bar with adjustable gap.

The cast glass plates were then placed in an oven and the films cured for 60 minutes at 120° C., then 10 minutes at 200° C., then 60 minutes at 250° C., and then 30 minutes at 300° C.

The glass plates were then removed from the oven, cooled down to room temperature and the films peeled from the glass plates.

The peeled films were then subjected to the following tests:

Yellowness Index—ASTM D1925;
Transmittance (%)—Transmittance was measured at 440 nm on a UV-3101PC UV-VIS-NIR Scanning Spectrophotometer manufactured by Shimazu Corp. The Scanning Spectrophotometer employed UVPC color analysis software supplied by the manufacturer. A double-beam method was employed and a glass slide measuring 1 mm in thickness was used as a reference. Thickness calibration curves (acceptable range=20 to 50 $\mu$m) were prepared for each sample and the color for each sample at a thickness of 30 $\mu$m was determined. Transmittance measurements were calibrated in accordance with the principles of Beer's law. Yellowness Index measurements were calibrated in accordance with the assumption that the yellowness index is proportional to the sample thickness in the thickness range of 10 to 60 $\mu$m; and
Toughness (P,F); Samples were manually folded onto themselves and creased. Samples that did not crack or break during this fold test were deemed to have passed, while samples that cracked or broke were deemed to have failed this test.

EXAMPLES 1 TO 40

In Examples 1 to 40, polyimide film samples prepared with various monomers were evaluated for % transmittance, yellowness index and toughness. The results are set forth in Table I.

TABLE I

SUMMARY OF EXAMPLES 1 TO 40

| EXAMPLE NO. | MONOMERS | DIAMINE MONOMER RATIO | Transmittance % | Yellowness Index | Toughness (P, F) |
|---|---|---|---|---|---|
| 1 | BPDA/44DDS | | 85 | 8 | F |
| 2 | BPDA/BAPSM | | 86 | 9 | P |
| 3 | BPDA/BAPS | | 68 | 20 | P |

TABLE I-continued

SUMMARY OF EXAMPLES 1 TO 40

| EXAMPLE NO. | MONOMERS | DIAMINE MONOMER RATIO | Transmittance % | Yellowness Index | Toughness (P, F) |
|---|---|---|---|---|---|
| 4 | BPDA/MDA | | 56 | 29 | P |
| 5 | BPDA/BAPP | | 40 | 37 | P |
| 6 | BPDA//44DDS/BAPSM | 70:30 | 84 | 9 | P |
| 7 | BPDA//44DDS/BAPSM | 90:10 | 85 | 9 | F |
| 8 | BPDA//44DDS/BAPS | 70:30 | 80 | 11 | P |
| 9 | BPDA//44DDS/BAPS | 90:10 | 79 | 11 | F |
| 10 | BPDA//44DDS/MDA | 70:30 | 75 | 16 | P |
| 11 | BPDA//44DDS/MDA | 90:10 | 81 | 10 | F |
| 12 | BPDA//44DDS/BAPP | 70:30 | 62 | 25 | P |
| 13 | BPDA//44DDS/BAPP | 90:10 | 79 | 13 | F |
| 14 | BPDA//BAPS/BAPSM | 70:30 | 72 | 18 | P |
| 15 | BPDA//BAPS/BAPSM | 90:10 | 70 | 18 | P |
| 16 | BPDA//MDA/BAPSM | 70:30 | 63 | 24 | P |
| 17 | BPDA//MDA/BAPSM | 90:10 | 61 | 26 | P |
| 18 | BPDA//BAPP/BAPSM | 70:30 | 51 | 30 | P |
| 19 | BPDA//BAPP/BAPSM | 90:10 | 43 | 34 | P |
| 20 | 6FDA/44DDS | | 90 | 1 | F |
| 21 | 6FDA/BAPSM | | 88 | 7 | P |
| 22 | 6FDA/BAPS | | 86 | 9 | P |
| 23 | 6FDA/MDA | | 75 | 18 | P |
| 24 | 6FDA/BAPP | | 74 | 17 | P |
| 25 | 6FDA//44DDS/BAPSM | 70:30 | 94 | 4 | P |
| 26 | 6FDA//44DDS/BAPSM | 90:10 | 89 | 4 | F |
| 27 | 6FDA//44DDS/BAPS | 70:30 | 90 | 5 | P |
| 28 | 6FDA//44DDS/BAPS | 90:10 | 93 | 4 | F |
| 29 | 6FDA//44DDS/MDA | 70:30 | 92 | 5 | P |
| 30 | 6FDA//44DDS/MDA | 90:10 | 88 | 7 | F |
| 31 | 6FDA//44DDS/BAPP | 70:30 | 87 | 8 | P |
| 32 | 6FDA//44DDS/BAPP | 90:10 | 88 | 6 | F |
| 33 | 6FDA//BAPS/BAPSM | 70:30 | 87 | 8 | P |
| 34 | 6FDA//BAPS/BAPSM | 90:10 | 86 | 8 | F |
| 35 | 6FDA//MDA/BAPSM | 70:30 | 83 | 11 | P |
| 36 | 6FDA//MDA/BAPSM | 90:10 | 73 | 18 | F |
| 37 | 6FDA//BAPP/BAPSM | 70:30 | 78 | 14 | P |
| 38 | 6FDA/BAPP/BAPSM | 90:10 | 69 | 18 | F |
| 39 | BTDA/44DDS | | 51 | 36 | P |
| 40 | BTDA//44DDS/BAPSM | 70:30 | 48 | 38 | P |

The Working Examples generally demonstrate that the polyimide films of the present invention exhibit % transmittance, yellowness index and toughness properties comparable to those exhibited by polyimide films prepared from aromatic dianhydrides and para-substituted aromatic diamines (i.e., Working Examples 2 and 21). For example, Working Examples 22 to 24 demonstrate that polyimide films prepared from an aromatic dianhydride and a para-substituted aromatic diamine exhibit a % transmittance of >70% and a yellowness index of <40. Moreover, these films do not crack or break when folded and creased.

Working Examples 1, 6 to 13, 20 and 25 to 32 generally demonstrate that brittleness or low toughness that may result from the use of para-substituted aromatic diamines having $SO_2$ functionality (i.e., 44DDS) is overcome by the use of a second para-or meta-substituted diamine monomer in an amount greater than 10% by weight based on the total weight of the diamine monomers. It is noted that increased color may be exhibited in BPDA//44DDS/BAPP films.

Working Examples 3, 5, 14, 15, 18 and 19 demonstrate that high color that may result from the use of para-substituted aromatic diamines that contain ether linkages (i.e., BAPS, BAPP) is decreased (i.e., % transmittance increased, yellowness index decreased) by the use of a second para- or meta-substituted diamine monomer.

Working Examples 4, 16 and 17 demonstrate that high color that may result from the use of para-substituted aromatic diamines that contain no electron withdrawing groups (i.e., MDA) is decreased (i.e., % transmittance increased, yellowness index decreased) by the use of a second meta-substituted diamine monomer.

Working Examples 33 to 38 demonstrate that the use of a second para- or meta-substituted diamine monomer in an amount less than or equal to 10% by weight based on the total weight of the diamine monomers in 6FDA polyimide films may adversely impact upon the toughness of the resulting film.

Working Examples 39 to 40 demonstrate that BTDA/44DDS and BTDA//44DDS/BAPSM polyimide films fail to demonstrate a % transmittance of >70%.

While the subject invention has been described in detail with reference to specific embodiments thereof, it will be apparent to those skilled in the art that various changes and modifications can be made therein without departing from the spirit and scope thereof.

Having thus described the invention, what is claimed is:
1. An essentially colorless, transparent polyamic acid solution prepared by reacting at least one aromatic tetracarboxylic acid dianhydride with at least one para-substituted aromatic diamine in an organic polar solvent wherein said aromatic tetracarboxylic acid dianhydride(s) is represented by general formula:

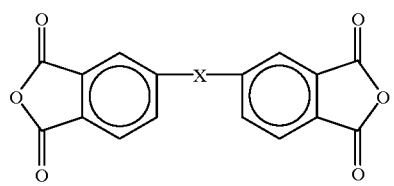

wherein X represents —O—, —S—, —SO—, —SO$_2$—, —CH$_2$—, —CF$_2$—, —C(CH$_3$)$_2$—, —C(CF$_3$)$_2$— or a direct bond, and wherein said para-substituted aromatic diamine(s) is represented by either general formula (I)

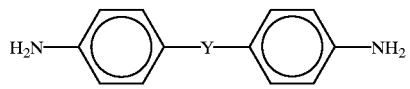

or general formula (II)

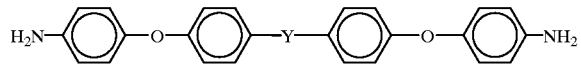

wherein Y represents —O—, —S—, —SO—, —SO$_2$—, —CH$_2$—, -CF$_2$—, —C(CH$_3$)$_2$—, —C(CF$_3$)$_2$—, —CO—or a direct bond.

2. The essentially colorless, transparent polyamic acid solution of claim 1, wherein said polyamic acid solution is prepared by reacting at least one meta-substituted aromatic diamine with said aromatic tetracarboxylic acid dianhydride (s) and with said para-substituted aromatic diamine(s).

3. The essentially colorless, transparent polyamic acid solution of claim 1, wherein said aromatic tetracarboxylic acid dianhydride(s) and said para-substituted aromatic diamine(s) are reacted at temperatures of greater than 80° C.

4. The essentially colorless, transparent polyamic acid solution of claim 2, wherein said aromatic tetracarboxylic acid dianhydride(s), said para-substituted aromatic diamine (s) and said meta-substituted aromatic diamine(s) are reacted at temperatures of greater than 80° C.

5. An essentially colorless, transparent polyamic acid solution prepared by reacting 2,2-bis(3,4-dicarboxyphenyl) hexafluoropropane dianhydride with bis[4-aminophenyl] sulfone in an organic polar solvent.

6. The essentially colorless, transparent polyamic acid solution of claim 5, wherein said 2,2-bis(3,4-dicarboxyphenyl) hexafluoropropane dianhydride and said bis[4-aminophenyl] sulfone are reacted at temperatures of greater than 80° C.

7. An essentially colorless, transparent polyamic acid solution prepared by reacting 2,2-bis(3,4-dicarboxyphenyl) hexafluoropropane dianhydride with bis[4-aminophenyl] sulfone and bis[4-(3-aminophenoxy)phenyl] sulfone in an organic polar solvent.

8. The essentially colorless, transparent polyamic acid solution of claim 7, wherein said 2,2-bis(3,4-dicarboxyphenyl) hexafluoropropane dianhydride, said bis [4-aminophenyl] sulfone and said bis[4-(3-aminophenoxy) phenyl] sulfone are reacted at temperatures of greater than 80 ° C.

9. The essentially colorless, transparent polyamic acid solution of claim 7, wherein from about 65 to about 85% by weight of bis[4-aminophenyl] sulfone and from about 15 to about 35% by weight of bis [4-(3-aminophenoxy)phenyl] sulfone are used to prepare said polyamic acid solution.

10. An essentially colorless, transparent polyamic acid solution prepared by reacting biphenyltetracarboxylic acid dianhydride with bis[4-aminophenyl] sulfone in an organic polar solvent.

11. The essentially colorless, transparent polyamic acid solution of claim 10, wherein said biphenyltetracarboxylic acid dianhydride and said bis[4-aminophenyl] sulfone are reacted at temperatures of greater than 80° C.

12. An essentially colorless, transparent polyamic acid solution prepared by reacting biphenyltetracarboxylic acid dianhydride with bis[4-aminophenyl] sulfone and bis [4-(3-aminophenoxy)phenyl] sulfone in an organic polar solvent.

13. The essentially colorless, transparent polyamic acid solution of claim 12, wherein said biphenyltetracarboxylic acid dianhydride, said bis[4-aminophenyl] sulfone and said bis [4-(3-aminophenoxy)phenyl] sulfone are reacted at temperatures of greater than 8$^{0°}$ C.

14. The essentially colorless, transparent polyamic acid solution of claim 12, wherein from about 65 to about 85% by weight of bis[4-aminophenyl] sulfone and from about 15 to about 35% by weight of bis [4-(3-aminophenoxy)phenyl] sulfone are used to prepare said polyamic acid solution.

15. An essentially colorless, transparent polyimide coating or film comprising at least one recurring structural unit of either general formula (A)

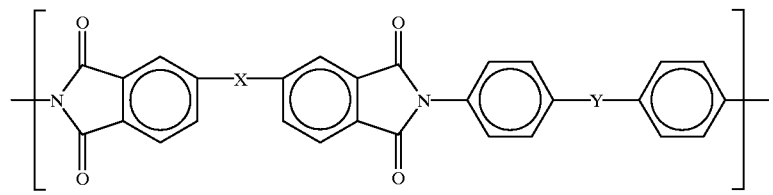

or general formula (B)

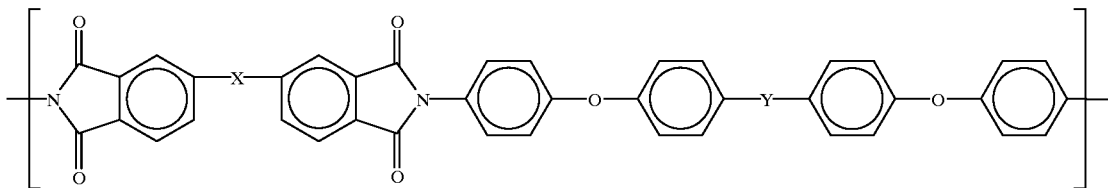

wherein X represents —O—, —S—, —SO—, —SO$_2$—, —CH$_2$—, —CF$_2$—, —C(CH$_3$)$_2$—, —C(CF$_3$)$_2$—or a direct bond; and wherein Y represents —O—, —S—, —SO—, —SO$_2$—, —CH$_2$—, —CF$_2$—, -C(CH$_3$)$_2$—, —C(CF$_3$)$_2$—, —CO—or a direct bond.

16. The essentially colorless, transparent polyimide coating or film of claim 15, wherein said coating or film demonstrates a % transmittance of at least 70% at 440 nanometers for coating or film thicknesses of 20±10 micrometers and a yellowness index of less than 40.

17. The essentially colorless, transparent polyimide coating or film of claim 15 which comprises at least one recurring structural unit of formula:

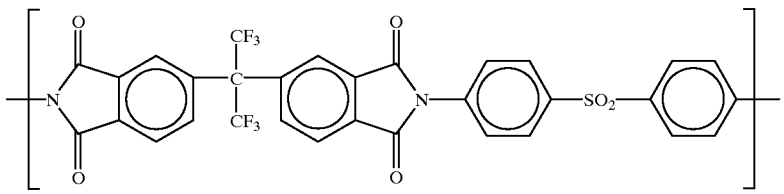

18. The essentially colorless, transparent polyimide coating or film of claim 15, which comprises at least one recurring structural unit of formula:

19. A process for preparing an essentially colorless, transparent polyimide coating or film which comprises:
  preparing a polyamic acid solution by reacting at least one aromatic tetracarboxylic acid dianhydride with at least one para-substituted aromatic diamine and, optionally, with at least one meta-substituted aromatic diamine in an organic polar solvent;
  forming a coating or film of said polyamic acid of said prepared polyamic acid solution; and
  imidizing said polyamic acid in said formed coating or film to a polyimide,
  wherein said aromatic tetracarboxylic acid dianhydride(s) is represented by general formula:

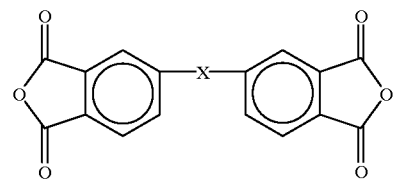

wherein X represents —O—, —S—, —SO—, —SO$_2$—, —CH$_2$—, —CF$_2$—, —C(CH$_3$)$_2$—, —C(CF$_3$)$_2$—or a direct bond, and wherein said para-substituted aromatic diamine(s) is represented by either general formula (I)

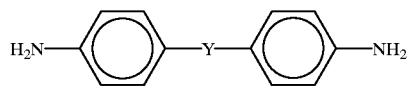

or general formula (II)

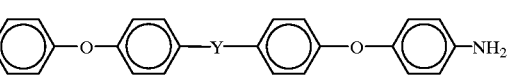

wherein Y represents —O—, —S—, —SO—, —SO$_2$—, —CH$_2$—, —CF$_2$—, —C(CH$_3$)$_2$—, —C(CF$_3$)$_2$—, —CO—or a direct bond.

20. The process of claim 19, wherein said polyamic acid solution is prepared by reacting at least one aromatic tetracarboxylic acid dianhydride and at least one para-substituted aromatic diamine at temperatures of greater than 80° C.

21. The process of claim 20, wherein said aromatic tetracarboxylic acid dianhydride is 2,2-bis(3,4-dicarboxyphenyl) hexafluoropropane dianhydride and wherein said para-substituted aromatic diamine is bis[4-aminophenyl] sulfone.

22. The process of claim 20, wherein said aromatic tetracarboxylic acid dianhydride is biphenyltetracarboxylic acid dianhydride and wherein said para-substituted aromatic diamine is bis[4-aminophenyl]sulfone.

23. The process of claim 19, wherein said polyamic acid solution is prepared by reacting at least one aromatic tetracarboxylic acid dianhydride, at least one para-substituted aromatic diamine and at least one meta-substituted aromatic diamine at temperatures of greater than 80° C.

24. The process of claim 23, wherein said aromatic tetracarboxylic acid dianhydride is 2,2-bis(3,4-dicarboxyphenyl) hexafluoropropane dianhydride, wherein said para-substituted aromatic diamine is bis[4-aminophenyl] sulfone and wherein said meta-substituted aromatic diamine is bis [4-(3-aminophenoxy)phenyl] sulfone.

25. The process of claim 23, wherein said aromatic tetracarboxylic acid dianhydride is biphenyltetracarboxylic acid dianhydride, wherein said para-substituted aromatic diamine is bis[4-aminophenyl] sulfone and wherein said meta-substituted aromatic diamine is bis [4-(3-aminophenoxy)phenyl] sulfone.

26. The process of claim 19, wherein said organic polar solvent is selected from the group consisting of dimethylacetamide, dimethylformamide, tetrahydrofuran, dioxolane and mixtures thereof.

* * * * *

UNITED STATES PATENT AND TRADEMARK OFFICE
CERTIFICATE OF CORRECTION

PATENT NO. : 6,232,428 B1
DATED : May 15, 2001
INVENTOR(S) : Deets et al.

It is certified that error appears in the above-identified patent and that said Letters Patent is hereby corrected as shown below:

Column 12,
Line 41, delete "8°° C" and after "than" insert -- 80° C --

Signed and Sealed this

Fifth Day of March, 2002

*Attest:*

*Attesting Officer*

JAMES E. ROGAN
*Director of the United States Patent and Trademark Office*